June 24, 1947.  R. I. JOHNS  2,422,969
DECORATIVE PRODUCTS COMPRISING GLASS FIBERS
Filed Oct. 7, 1944

Inventor:
Robert I. Johns,
By a. Ponek
Attorney

Patented June 24, 1947

2,422,969

UNITED STATES PATENT OFFICE 2,422,969

DECORATIVE PRODUCTS COMPRISING GLASS FIBERS

Robert I. Johns, Brooklyn, N. Y.

Application October 7, 1944, Serial No. 557,671

7 Claims. (Cl. 154—46)

1

The present application is in part a continuation of my copending application, Serial No. 414,952, filed on October 14, 1941.

The present invention relates to decorative glass fiber products:

Spun glass has heretofore been used for decorative purposes. Thus, the fine flexible glass fibers, which could be of various colors, were placed on a paper backing to which they were secured by any conventional adhesive, to form a product adapted for use as wall paper, i. e., for covering large flat surfaces. The fibers were in various colors and could be coated suitably to prevent separation from the backing and splintering when handled.

However, water in the paste, used to hold the paper to the wall surface, might soak through the paper and loosen the fibers from the surface, and also act as a carrier for stains, penetrating the paper to discolor the surface beneath the semi-transparent fibers, and thus impairing the whole decorative effect.

The present invention relates to an improvement in products which comprise glass fibers for decorative purposes, in order to prevent the soaking and staining referred to, and also to make possible the application of the decorative glass fibers to uneven, embossed and carved surfaces, and other surfaces of various contours, sizes, dimensions and degree of regularity or irregularity.

Products within the scope of the present invention comprise moldings, such as are used in wall panelling or trim, or for picture frames, or around window displays; they may also include, among other things, letters such as are used in signs or the like; in all of these products, decorative glass fibers would be an element of the structure. The invention also extends, for example, to decorative panels used on furniture or in show windows, or to form valances for show windows, as for decorating interiors, such as room interiors, vehicle interiors and the like.

Generally stated, the products of the present invention comprise a layer of glass fibers superimposed upon a backing which may be of a permanently non-deformable solid character or of a character which, at some phase or other in the production thereof, is plastic and deformable. The method of manufacture of the products of

2 the invention is somewhat modified, as will hereinafter appear, in accordance with the character and nature of the backing.

The foregoing and other features of the invention will be best understood and appreciated from the following description of preferred embodiments thereof selected for illustrative purposes and shown on the accompanying sheet of drawings wherein.

Figure 1:
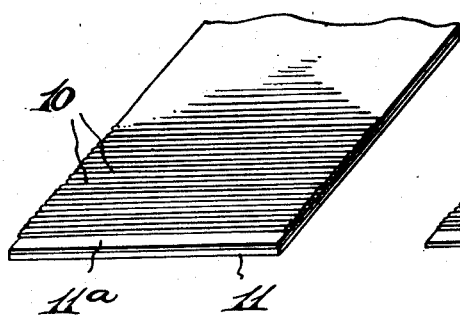
Fig. 1 is a perspective view of one embodiment of the product of the first phase of the process of manufacture according to this invention.

Referring now more particularly to Fig. 1 of the drawings, the fine flexible glass fibers 10 are first laid in assentially mutual parallel relationship upon a flexible backing 11, which may, if desired, be a waterproof paper or waterproof cloth. First, however, before the fibers are so arranged, backing 11 has a suitable waterproof material applied thereto to form an adhesive layer 11a. The material utilized for this purpose may be selected from a group of substances which lend themselves to solution in suitable, easily vaporizable solvents. Such material would include plastics such as cellulose acetate, in solution in a solvent such as acetone.

Figure 2:
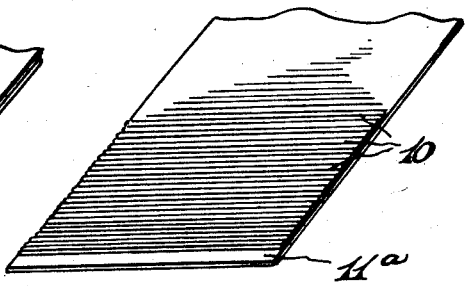
Fig. 2 is a perspective view of another embodiment of the product of the first phase of the process of manufacture according to this invention.

The intent is to leave a substantially tacky or adhesive surface into which fibers 10 may be laid and then held by the adhesive action of the layer, which, of course, functions as if the backing and the layer were laminations. The backing itself may be a sheet of plastic material, e. g. cellulose acetate. In such case, the single sheet of backing 11 may be rendered adhesive by the application to the surface of the sheet of a solvent such as acetone (Fig. 2). No flexible support 11 needs be employed in this form. The type and character of the backing and/or plastic material may be widely varied, materials which are per se known and suitable for the purpose of this invention being capable of use in this regard.

After application of the fibers 10 to the backing 11 and/or 11a, prepared in the manner indicated, the surface of the resultant product is then preferably sprayed or otherwise coated with a solution in a volatile solvent, prepared from a material such as Vinylite, cellulose acetate, or the like, which, in the final state after spraying, produces a transparent deposit. Either colorless or colored materials may be used, so long as they result in transparent deposits. The result of this spraying should be that all of the fibers will be securely bound together and integrated in coplanar relation, and also will be protected against surface abrasion. This last application penetrates through the interstices between the fibers 10 and integrates itself with the material 11a. The waterproof character of the backing 11 and/or 11a prevents water from passing through, and becoming visible on the glass fiber surface, and thus prevents marring of the appearance of the product by water staining.

In the event that the product of the first phase of the process is to be associated with a backing of solid, essentially non-pressure-deformable material, such as wood or molded non-thermoplastic resinous material, e. g., cured "Bakelite"—as, for example, in the production of molding or sign letters—use is conveniently made, in the second stage of the process, of a mold or die 12 (see Fig. 3) of a configuration corresponding to the contour of the surface of the letter or other product being provided with a decorative surface.

Figure 3:
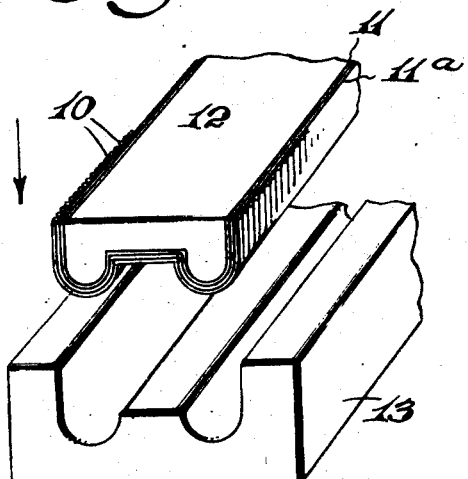
Fig. 3 is a perspective view showing the relationship between one embodiment of the invention and the apparatus used in making the same.

In the second stage of the process, according to the embodiment corresponding to Fig. 3, the product of the first stage (backing sheet plus layer of glass fibers) is lightly affixed to the surface of the material 12 being decorated, use being conveniently made for this purpose of an adhesive of the type hereinbefore described. The product of this first stage is then inserted in the mold or die 13 and the surface of treated glass and backing is pressed into the mold or die and left to dry, preferably under pressure.

Thus the mold forms the female element and the material to be decorated plus the glass surface affixed thereto forms the male element. This will cause the decorated surface to conform exactly to the shape or contour of the material to be decorated, and to follow its contours, curves, depressions or elevations. The die or mold must be slightly larger than the contour outline of the material to compensate for the thickness of the decorative glass surface plus backing.

Figure 4:
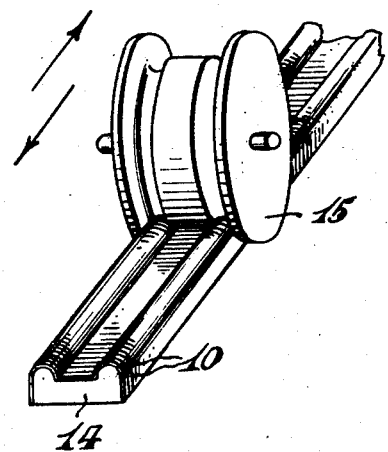
Fig. 4 is a perspective view showing the relationship between a second embodiment of the invention and the means employed in the production thereof.

In the event the product of the first phase is to be associated with a backing 14 of material, such as a moldable material which at any stage in the production thereof is in a soft, pliable or plastic condition, the second stage of the process may preferably be carried out as illustrated in Fig. 4 of the drawings.

According to this modification of the invention, the decorative glass surface with associated backing sheet may conveniently be applied to material 14 while this material is still in its aforesaid moldable state, whereupon the resultant assembly may be suitably shaped or configured. In this event, it is also desirable to secure the parts together by means of an adhesive such as heretofore described.

As shown in Fig. 4 of the drawings, use may conveniently be made of a shaping member in the form of a die wheel 15, the tread or periphery of which is so shaped or configured as to impart the desired surface contour to the assembly 10, 11, 14 when applied thereto under pressure. The die wheel is, as shown, applied to the glass-surfaced side of the assembly and the wheel is rotated up and back, under downward pressure, in the direction of the arrows until the final configuration is realized.

If necessary, owing to the character of material 14, external heat may be applied, for example by heating means located within wheel 15, to maintain material 14 in moldable condition pending its final shaping.

In some cases, as where material 14 is in an intermediate stage of polymerization, e. g., Bakelite or urea-formaldehyde resin, a final curing and/or setting treatment under heat and/or pressure may be necessary. In other cases, the configured product may rigidify in air.

The die 15 need not be a wheel, but may be a suitably shaped die block which is slid up and back on the material in the direction of the arrows on Fig. 4. The member 13 of Fig. 3 may be used as such a die block.

In the event a plastic backing sheet is used for the glass fibers in the formation of the product of the first stage of the process, it is preferred to use a material which, upon being wetted with a suitable solvent, provides the requisite adhesive surface for adherence to the material 12 or 14.

Where it is desired to decorate flat or flexible panel forms, the film or backing sheet 11 may be applied directly to the panel surface in the form of an opaque coating or film; the decorative glass fibers may be applied directly on this surface without using a separate backing paper or cloth. Where a separate backing sheet or film is used, preferably it is provided with an adhesive surface when it is wetted with a solvent. The glass surface may then be coated finally with a solution of the types hereinbefore mentioned, or the whole unit may be impregnated with such a solution.

The glass surface may also be transferred, face down, to the permanent material, after the glass surface has been coated with opaque stainproof film. The backing may be removed, as in decalcomania practice, before making a final application of the coating or impregnating solution, as in decalcomania practice.

The panels may be of any material, such as wood, metal, fiber, wall or card board, or plastic sheet and the type material used in panels may be governed as to requirements of usage, where fireproof, sound or temperature insulation qualities are important. When translucency is desired, as in valances, the panels may be of plastic sheet material.

While Figures 3 and 4 have been described primarily in connection with the surface structure shown in Fig. 1, it is obvious that the surface structure shown in Fig. 2 can also be utilized in making the products according to the showings of Figures 3 and 4.

Figure 5:
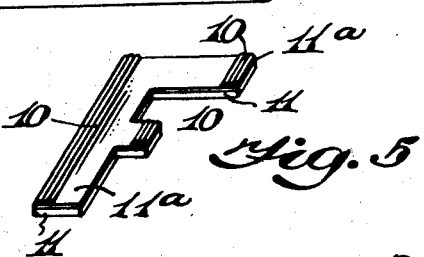
Fig. 5 is a view of a decorated letter according to the present invention.

Fig. 5 shows the application of the invention to the decoration of a letter to be used, for example, in sign building. Corresponding reference numerals refer to corresponding parts.

The binding adhesive material, according to the present invention, may, as above stated, be a cellulose acetate composition. However, use may also be made of any one of a number of substances which have been found to be suitable for the purposes indicated, e. g., the so-called acrylic resins, the so-called Glyptal (i. e., glycerol phthalic anhydride) resins, certain phenol-formaldehyde resins, the urea formaldehyde resins, etc. The solvent to be used varies with the particular resin employed. In general, acetone will be found to be well suited to the present purpose.

Having described the invention, what is claimed is:

1. A decorative material including a backing, a plurality of members formed from glass and substantially cylindrical in cross-section, the members being thin and flexible but of sufficient rigidity normally to retain a rectilinear form, the backing having applied to one side thereof a solution in a vaporizable solvent of a water resistant plastic substance of the type to produce a transparent body on drying, the members being arranged in the applied substance while said substance is still associated with the solvent so that portions of the members contiguous to the substance are wetted thereby, the members being arranged in side-by-side relationship and in close proximity to each other, and a coating of said substance applied over the members as arranged on the backing, the coating being in sufficient volume to penetrate between the members and consolidate with the substance as originally applied to the backing.

2. A decorative material including a backing capable of conforming to the contour of a wall or similar support, a plurality of members formed from glass, each of the members being thin, substantially cylindrical in cross-section, and flexible but of sufficient rigidity normally to retain a rectilinear form, the backing having applied to one side thereof a solution in a vaporizable solvent of a water resistant plastic substance of the type to produce a transparent body on evaporation of the solvent and a sticky body during such evaporation, the members being positioned upon the treated side of the backing and in the sticky body of the plastic substance to be wetted thereby, the members being arranged in side-by-side relationship and in close proximity to each other, and a coating of a similar substance applied over the members as arranged on the backing, the coating being in sufficient volume to penetrate between the members and consolidate with the substance as originally applied to the backing.

3. A decorative material including a backing, a plurality of members formed from glass, each of the members being thin, substantially cylindrical in cross-section, and flexible but of sufficient rigidity normally to retain a rectilinear form, the backing having applied to one side thereof a solution in a vaporizable solvent of a water resistant plastic substance of the type to produce a transparent body on evaporation of the solvent and a sticky body during such evaporation, the members being positioned upon the treated side of the backing and in the sticky body of the plastic substance to be wetted thereby, the members being arranged in side-by-side relationship and in close proximity to each other, and an application of said substance over the members as arranged on the backing, the application being in sufficient volume to form a skin over the members, to penetrate between the members, and to consolidate with the substance as originally applied to the backing.

4. A decorative material including a backing, a plurality of members formed from glass, each of the members being thin, substantially cylindrical in cross-section, and flexible but of sufficient rigidity normally to retain a rectilinear form, the backing having applied to one side thereof a solution in a vaporizable solvent of a water resistant plastic substance of the type to produce a transparent body on evaporation of the solvent and a sticky body during such evaporation, the members being positioned upon the treated side of the backing and in the sticky body of the plastic substance to be wetted thereby, the members being arranged in side-by-side relationship and in close proximity to each other, and a layer of said substance disposed over the members as arranged on the backing, the layer, the members and the backing being substantially integrated by heat and pressure.

5. A decorative material including a backing, a plurality of members formed from glass, each of the members being thin, substantially cylindrical in cross-section, and flexible but of sufficient rigidity normally to retain a rectilinear form, the backing having applied to one side thereof a solution in a vaporizable solvent of a water resistant plastic substance selected from the group including cellulose acetate and Vinylite and capable of producing a transparent body on evaporation of the solvent and a sticky body during such evaporation, the members being positioned upon the treated side of the backing and in the sticky body of the plastic substance to be wetted thereby, the members being arranged in side-by-side relationship and in close proximity to each other, and an application of said substance over the members as arranged on the backing, the application being in sufficient volume to form a skin over the members, to penetrate between the members, and to consolidate with the substance as originally applied to the backing.

6. A decorative material including a backing, a plurality of members formed from glass, each of the members being thin, substantially cylindrical in cross-section, and flexible but of sufficient rigidity normally to retain a rectilinear form, the backing having applied to one side thereof a solution in a vaporizable solvent selected from the group including acetone of a water resistant plastic substance selected from the group including cellulose acetate and Vinylite and capable of producing a transparent body on evaporation of the solvent and a sticky body during such evaporation, the members being positioned upon the treated side of the backing and in the sticky body of the plastic substance to be wetted thereby, the members being arranged in side-by-side relationship and in close proximity to each other, and an application of said substance over the members as arranged on the backing, the application being in sufficient volume to form a skin over the members, to penetrate between the members, and to consolidate with the substance as originally applied to the backing.

7. A decorative material including a backing, a plurality of members formed from glass, each of the members being thin, substantially cylindrical in cross-section, and flexible but of sufficient rigidity normally to retain a rectilinear form, the backing having applied to one side thereof a solution in a vaporizable solvent of a water resistant plastic substance selected from the group including cellulose acetate, Vinylite, the Glyptal resins, the phenol formaldehyde resins and the urea-formaldehyde resins, and capable of producing a transparent body on evaporation of the solvent and a sticky body during such evaporation, the members being positioned upon the treated side of the backing and in the sticky body of the plastic substance to be wetted thereby, the members being arranged in side-by-side relationship and in close proximity to each other, and an application of said substance over the members as arranged on the backing, the application being in sufficient volume to form a skin over the members, to penetrate between the members, and to consolidate with the substance as originally applied to the backing.

ROBERT I. JOHNS.

REFERENCES CITED

The following references are of record in the file of this patent:

UNITED STATES PATENTS

| Number | Name | Date |
|---|---|---|
| 1,431,465 | Klapp | Oct. 10, 1922 |
| 1,194,462 | Abrams | Aug. 15, 1916 |
| 2,040,819 | Bebie et al. | May 19, 1936 |
| 1,903,960 | Dreyfus | Apr. 18, 1933 |
| 1,024,549 | Becker | Apr. 30, 1912 |

FOREIGN PATENTS

| Number | Country | Date |
|---|---|---|
| 129,981 | Austria | Oct. 25, 1932 |